J. T. FETHERSTON.
GRATE FOR DESTRUCTOR FURNACES.
APPLICATION FILED FEB. 2, 1910.
1,001,010.
Patented Aug. 22, 1911.
2 SHEETS—SHEET 1.
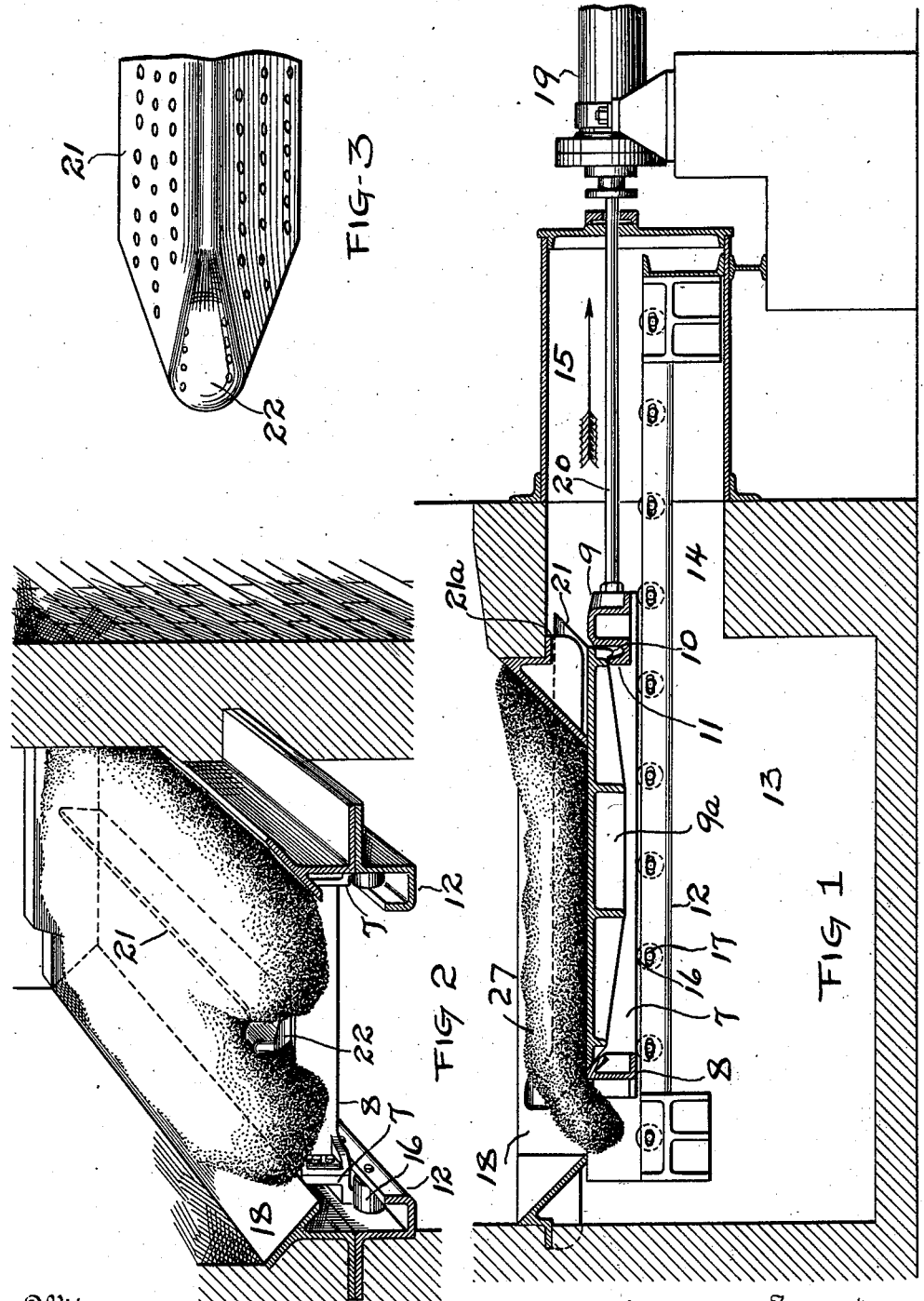

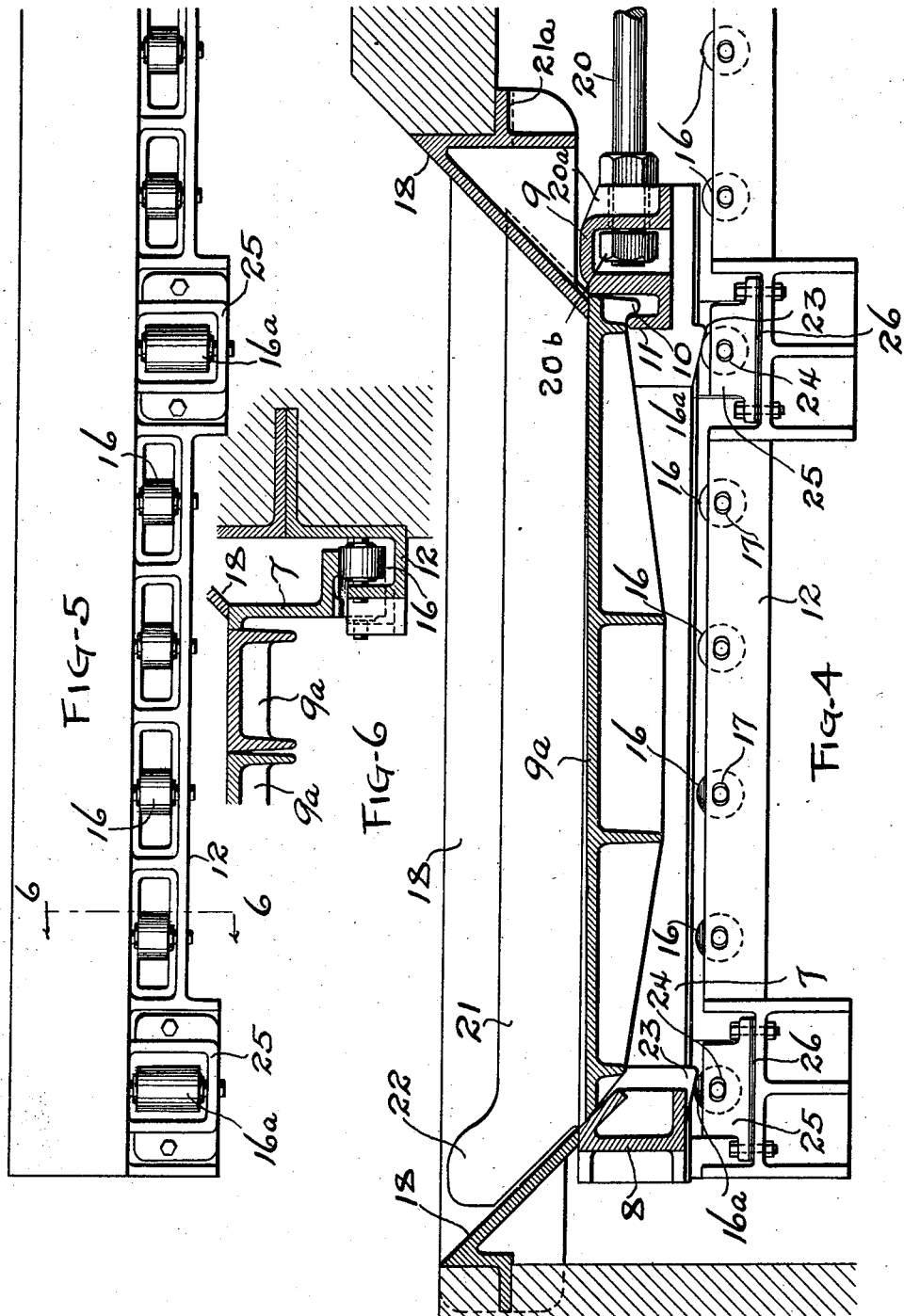

UNITED STATES PATENT OFFICE.

JOHN T. FETHERSTON, OF NEW YORK, N. Y., ASSIGNOR OF ONE-HALF TO POWER SPECIALTY COMPANY, OF NEW YORK, N. Y., A CORPORATION OF NEW YORK.

GRATE FOR DESTRUCTOR-FURNACES.

1,001,010.  Specification of Letters Patent.  Patented Aug. 22, 1911.

Application filed February 2, 1910. Serial No. 541,504.

*To all whom it may concern:*

Be it known that I, JOHN T. FETHERSTON, a citizen of the United States, residing at New York, in the county of Richmond and State of New York, have invented certain new and useful Improvements in Grates for Destructor-Furnaces, of which the following is a full, clear, and exact description.

In the operation of so-called destructor furnaces, for consuming household refuse and other waste materials, the clinker resulting from the combustion is extremely tough and tenacious and is difficult to break up and dislodge from the grate. Hitherto the practice has been to break up the clinker and rake it off the grate by manual labor, and this method of clinkering has been found to be greatly facilitated by the invention described and claimed broadly in my copending application Ser. No. 503,828, filed June 23, 1909. In the preferred embodiment of that invention lines of cleavage are formed in the mass of clinker by grate-bars of a general knife-edge form. The thickness of the mass is therefore reduced along these bars, so that it can be divided more easily.

In the copending application of Ernest H. Foster, filed of even date herewith, he has described and claimed broadly an improvement in destructor furnaces, comprising in its preferred form a movable grate capable of being drawn out of its normal position above the clinker-pit, with means coöperating with the grate to scrape off the clinker as the grate is moved.

My present invention combines these two schemes in a novel way, and also embraces certain novel features of improvement, more particularly in the direction of positively breaking up the clinker as it is scraped from the grate, and also of avoiding "bridging" of the mass, which leaves the same self-supporting after the grate has been withdrawn.

The preferred embodiment of the invention is illustrated in the annexed drawings, and referring now thereto, Figure 1 is a longitudinal vertical section showing the sliding grate shortly after its movement of retraction has begun. Fig. 2 is a sectional perspective view showing the grate in the same or a similar position. Fig. 3 is a detail plan view illustrating the novel form of cleavage bar employed to divide the clinker as the grate is retracted. Fig. 4 is a longitudinal section on a larger scale, showing certain features which for the sake of clearness are omitted from Figs. 1 and 2. Fig. 5 is a detail plan view of one of the rails or supports on which the grate slides. Fig. 6 is a detail cross section on line 6—6 of Fig. 5.

The grate shown comprises a pair of spaced side-members 7, 7, connected at their ends to the front and rear transverse end-members 8, 9. On the rectangular frame thus formed is a series of longitudinally extending grate bars 9$^a$, the front ends of which rest on the front-member 8, while their rear ends are formed with depending lugs 10 engaging a rail or rib 11 carried by the rear end-members. Below the side-members are two supports or rails 12, in the upper part of the clinker-pit 13, extending rearwardly through an opening 14, in the rear wall of the pit, into a chamber 15 immediately behind such opening. These rails carry two series of rollers 16, journaled in elongated bearings 17, and four rollers 16$^a$. During the major portion of the sliding movement of the grate it rests on the rollers 16, but at the beginning and end of its movement and while at rest in operative or normal position it rests on the rollers 16$^a$, being supported thereby above the clinker-pit and immediately below the downwardly inclined walls 18 of the combustion-chamber or grate-chamber, as hereinafter described. The said walls and the grate are preferably so proportioned that the former will overhang the latter, as shown, and the supporting rails are preferably of the skeleton type shown in Fig. 5 in order to permit free circulation of air for the purpose of cooling the ribs and rollers.

At the rear of the chamber 15 suitable means is provided, as per example a fluid pressure ram 19, for actuating the grate. In the construction illustrated the piston 20 of the ram is connected to the rear end-member 9 of the grate-frame, so that the movement of the pitson will advance or retract the grate, as the case may be. The connection mentioned is preferably loose, so that the parts can accommodate themselves to any change that may occur in their relative positions. For this purpose the piston rod 20 is extended through a vertical slot 20$^a$ in the member 9 and is held therein by two nuts 20$^b$, spaced far enough apart to permit lateral or vertical movement of the grate or the piston as the case may be.

One or more of the grate-bars, as for example the single bar 21 at or near the center of the grate, extend considerably above the level of the grate, such upper portion being triangular in cross-section or of knife-edge form, as described in my copending application before mentioned. The forward end of this bar, however, is provided with an upwardly and forwardly extending portion 22, preferably tapering toward the rear as shown, to form a parting member which serves to divide the mass of clinker as the bar is retracted with the grate. In this movement of the grate the member 21 passes through an opening 21ª in the rearmost of the walls 18.

It is desirable to have the grate in its normal position lie close to or in contact with the lower edges of the walls 18; accordingly I provide suitable means whereby as the grate begins its rearward movement it will be lowered clear of the combustion-chamber walls and will be raised again into normal relation thereto as it completes its forward movement. For this purpose end-members of the grate form are provided at their ends, on the under side, with rearwardly inclined extensions or lugs 23, resting on the rollers 16ª, which are journaled in elongated bearings 24 formed in small boxes 25 secured to the supporting rails. It will therefore be seen that as the grate starts to the rear it will ride down on the rollers 24 and thus be lowered away from the walls 18, and that as the grate returns to its advanced position it will ride up on the rollers and be carried up close to the said walls, out of contact with rollers 16. The boxes or supports for the rollers 16ª are bolted to the supporting members 12, as shown, so that by using a greater or less number of filler plates or devices 26 the height of the rollers may be adjusted and the position of the grate with respect to the combustion-chamber walls 18 regulated as desired.

From the foregoing the operation of my invention will be readily understood. When the clinker, shown at 27 in Figs. 1 and 2, is to be removed, the ram 19 is started. As the grate begins to move toward the rear the camming devices 23 permit it to fall away from the walls 18, as previously described. As the movement of the grate continues the parting extension 22 divides the clinker along the line of reduced thickness resulting from the upwardly extending member 21, the divided parts of the mass being directed inwardly and downwardly into the clinker-pit, as illustrated in Figs. 1 and 2. When the grate has reached its rearmost position the operation of the ram is reversed and the grate is advanced. Near the end of its forward movement the lifting rollers 16ª are encountered and the grate is cammed upwardly to its normal position close to the combustion-chamber walls 18, ready for a fresh charge of combustible material. By making the parting device 22 sufficiently higher than the bar 21 the rearward movement of the said device must result in a complete division of the clinker or in such disturbance of the mass as will inevitably cause it to fall into the clinker-pit, thus rendering it impossible for the mass to bridge or arch across the combustion-chamber.

As previously stated, the apparatus herein specifically illustrated and described is the preferred embodiment of the invention; and it is to be understood that the invention may be embodied in other forms without departure from its proper spirit and scope.

I claim:

1. In a destructor furnace, in combination, a movable grate, means for actuating the same, means carried by the grate and movable therewith for producing a line of reduced thickness in a mass of clinker on the grate, and parting means movable with the grate and constructed to divide the mass of clinker into parts along such line of reduced thickness as the grate moves.

2. In a destructor furnace, in combination, a sliding grate, means for actuating the same, a member carried by the grate and extending above the level of the grate to produce a line of reduced thickness in a mass of clinker on the grate, and parting means moving with the grate to divide the mass of clinker into parts along such line of reduced thickness as the grate moves.

3. In a destructor furnace, in combination, a sliding grate, means for actuating the same, a member carried by the grate and extending upwardly above the level thereof to produce a line of reduced thickness in a mass of clinker on the grate, and a parting device carried by the said member at one end thereof to divide the said mass into parts along the line of reduced thickness as the grate moves.

4. In a destructor furnace having a clinker-pit, in combination, walls defining an opening above the clinker-pit, a longitudinally sliding grate below said walls and normally closing said opening, an upwardly projecting longitudinally extending member carried by the grate to produce a line of reduced thickness in a mass of clinker on the grate, and means for sliding the grate bodily out from under said walls to clear the grate of clinker.

5. In a destructor furnace having a clinker-pit, in combination, walls defining an opening above the clinker-pit, the rearmost wall being provided with an opening, a rearwardly retractable grate below said walls and normally closing said opening above the clinker-pit, an upwardly projecting member carried by the grate in alinement with the opening in said rearmost wall and serving to produce a line of reduced thickness in a mass of clinker on the grate, power-actuated means for retracting and advancing the grate, and means for lowering the grate at the beginning of its rearward movement and raising the grate at the end of its forward movement.

6. In a destructor furnace having a clinker-pit, in combination, walls defining an opening above the clinker-pit, a sliding grate below the opening, supporting rails provided with rollers on which the grate moves in its sliding movement, camming devices depending from the grate, and vertically adjustable rollers carried by the supporting rails in position to engage the camming devices.

7. In a destructor furnace having a clinker-pit, in combination, a sliding grate supported at the top of the clinker pit, a scraping member mounted at one end of the grate above the same and provided with an opening, a longitudinally extending member carried by the grate in line with said opening and extending above the level of the grate to produce a line of reduced thickness in a mass of clinker on the grate, and power-actuated means for sliding the grate under the scraping member to dislodge clinker from the grate into the clinker pit.

8. In a destructor furnace having a clinker-pit, in combination, walls defining an opening above the clinker pit, a reciprocating grate below said walls and normally closing said opening, an upwardly projecting longitudinally extending member carried by the grate to produce a line of reduced thickness in the mass of clinker on the grate, and means for actuating the grate.

In testimony whereof I affix my signature in the presence of two subscribing witnesses.

JOHN T. FETHERSTON.

Witnesses:
 M. LAWSON DYER,
 S. S. DUNHAM.

---

Copies of this patent may be obtained for five cents each, by addressing the "Commissioner of Patents, Washington, D. C."